United States Patent
Strong et al.

(10) Patent No.: US 6,494,782 B1
(45) Date of Patent: Dec. 17, 2002

(54) THRESHING AND SEPARATING UNIT OF AXIAL FLOW COMBINES

(75) Inventors: Russell W. Strong, Craftsbury Commons, VT (US); Eric P. J. Van Quekelberghe, Moerkerke (BE)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/857,811

(22) PCT Filed: Nov. 24, 2000

(86) PCT No.: PCT/EP00/11804

§ 371 (c)(1), (2), (4) Date: Jun. 11, 2001

(87) PCT Pub. No.: WO01/37636

PCT Pub. Date: May 31, 2001

(30) Foreign Application Priority Data

Nov. 26, 1999 (GB) ............................................. 9927839

(51) Int. Cl.⁷ .................................................. A01F 12/34
(52) U.S. Cl. ............................................ 460/71; 460/80
(58) Field of Search ............................ 460/69, 71, 72, 460/119, 110, 122, 80, 81, 83, 84, 121

(56) References Cited

U.S. PATENT DOCUMENTS

| 4,178,943 A | * | 12/1979 | West ............................ 460/80 |
| 4,889,517 A | * | 12/1989 | Strong et al. .................. 460/66 |
| 4,936,810 A | * | 6/1990 | Strong et al. .................. 460/69 |
| 5,035,675 A | * | 7/1991 | Dunn et al. .................... 460/62 |
| 5,112,279 A | * | 5/1992 | Jensen et al. .................. 460/69 |
| 5,125,871 A | * | 6/1992 | Gorden .......................... 460/69 |
| 5,192,245 A | * | 3/1993 | Francis et al. ................ 460/71 |
| 5,192,246 A | * | 3/1993 | Francis et al. ................ 460/72 |
| 5,376,047 A | * | 12/1994 | Harden et al. .............. 460/121 |
| 5,413,531 A | * | 5/1995 | Tanis ............................ 460/72 |
| 5,688,170 A | * | 11/1997 | Pfeiffer et al. ................ 460/69 |
| 5,919,086 A | * | 7/1999 | Derry ............................ 460/72 |
| 6,325,714 B1 | * | 12/2001 | Tanis et al. ................... 460/71 |

FOREIGN PATENT DOCUMENTS

| EP | 0057380 | * | 8/1982 | ............. A01F/7/06 |
| EP | 0340876 | * | 8/1989 | ............. A01F/7/06 |

* cited by examiner

Primary Examiner—Robert E. Pezzuto
Assistant Examiner—Árpád F+e Kovács
(74) Attorney, Agent, or Firm—John William Stader; Larry W. Miller

(57) ABSTRACT

A combine harvester comprises a threshing and separating arrangement mounted to a main frame, which includes a generally cylindrical chamber having a generally longitudinal axis, and a separating concave assembly. The arrangement further includes a rotor assembly mounted for rotation in the chamber and comprising a generally cylindrical rotor body with a separating section associated with the separating concave assembly. This separating section comprises a plurality of longitudinal elements having a leading, generally longitudinally arranged crop engaging face and a plurality of transverse elements having a generally transversely arranged crop engaging edge. The transverse elements assist in preventing the roping of crop material between the rotor and the separating concave assembly.

7 Claims, 3 Drawing Sheets

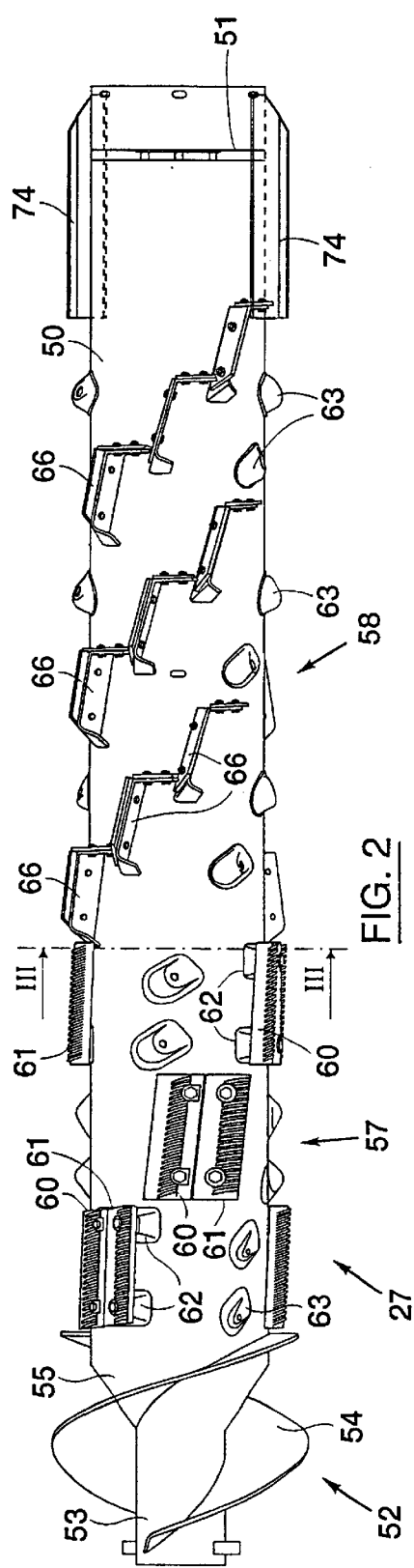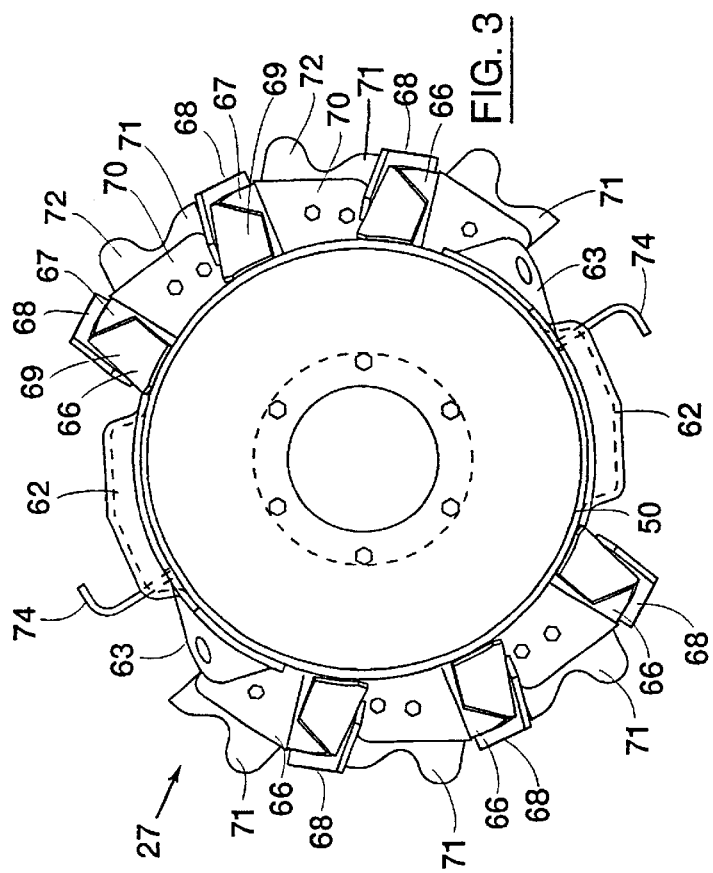

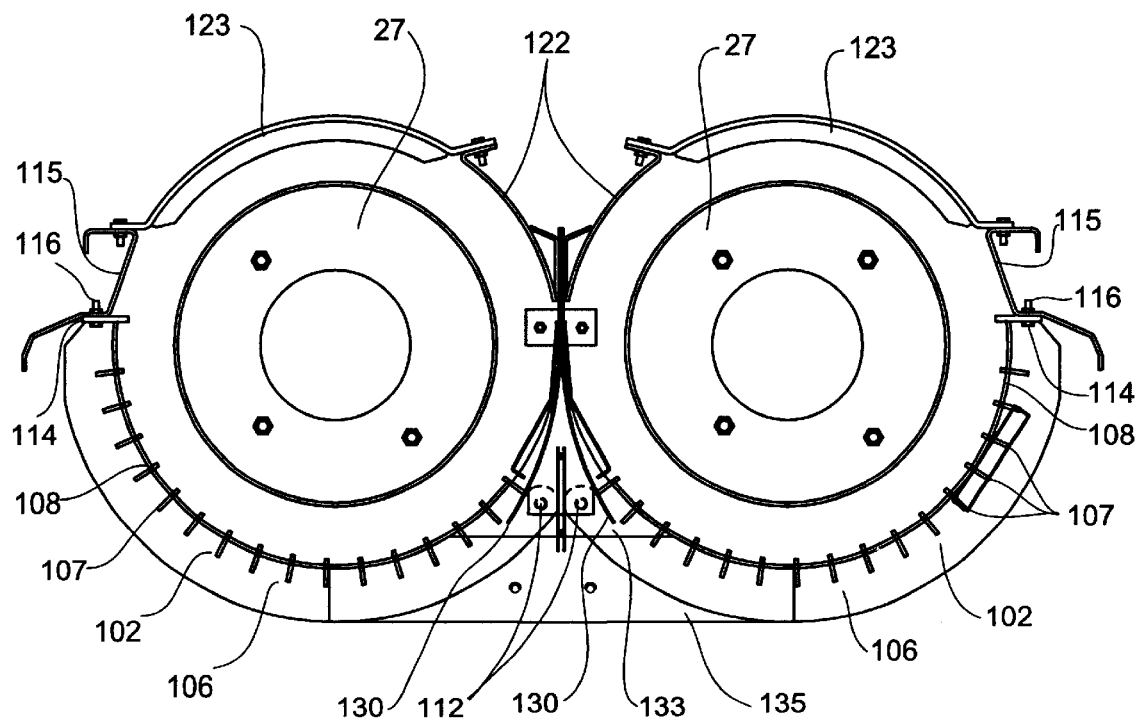
FIG. 4
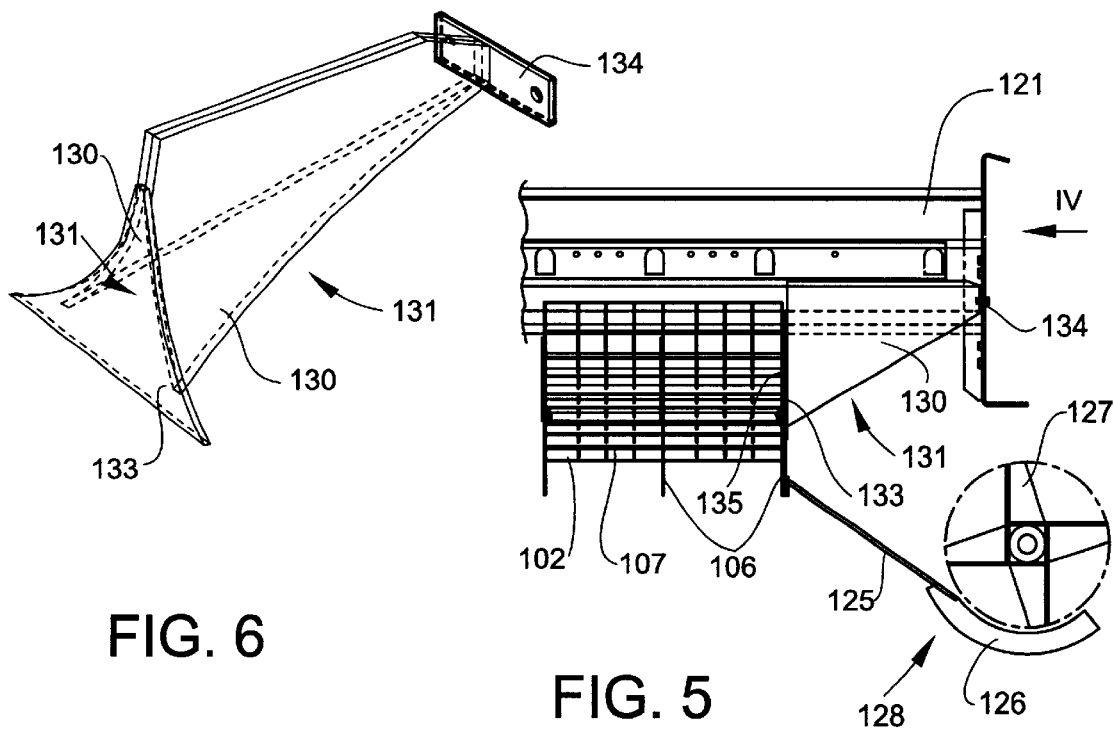
FIG. 6
FIG. 5

THRESHING AND SEPARATING UNIT OF AXIAL FLOW COMBINES

TECHNICAL FIELD OF THE INVENTION

The present invention relates to agricultural harvesters and, more particularly, to axial flow combine harvesters having a threshing and separating unit with at least one generally longitudinally arranged rotor for advancing crop material along a generally helical path.

BACKGROUND ART

In conventional combine harvesters crop material is fed between a threshing cylinder and an associated threshing concave, which extend transversely to the direction of combine travel. Hereby the crop is threshed over a comparatively short distance. Axial flow machines use one or more longitudinally arranged rotors and associated concaves. Herein, crop material is subjected to a much longer threshing and separating action than in a conventional machine and therefore, the efficiency of axial flow machines is greater because a higher degree of separation is reached and the grain losses are reduced. Commonly, axial flow combines are popular in regions with a continental climate, where the crops to be harvested ripen well and contain hardly any green parts at the time of the harvest. However, when the crop contains green material, such unit is particularly prone to plugging by slugs of accumulated crop material between the rotor and the concaves.

Various means have been provided onto the rotor to optimise the crop flow along the rear portion of the threshing and separating unit and to improve the Orotor performance under adverse conditions. U.S. Pat. No. 4,936,810, for example, suggests to use thinning elements in the form of generally radially extending fingers to smoothen the layer of crop material which is advancing along the concaves. The fingers co-operate with conventional longitudinal bars on the rotor body to move the crop layer along a helical path and to loosen the same. This system is still optimal when harvesting dry crops, but too often slugs occur when handling greener material.

U.S. Pat. No. 5,376,047 discloses a rotor equipped with a multitude of rectangular blades which can be distributed along the surface of the rotor in order to optimize the crop flow. For a particular crop and a particular crop condition, a blade distribution may be found which is optimal with respect to threshing and separating efficiency and/or plugging risks, but such investigation is not within reach of the ordinary operator.

In U.S. Pat. No. 4,178,943 a rotor is shown equipped with generally transverse fins behind the threshing section. The separation capacity of this embodiment is limited because of the restrained action of the fin heads on the layer of crop material. The grain losses at the end of the separation section may raise to unacceptable levels, unless the rate of incoming material is reduced by lowering the ground speed of the combine harvester.

Accordingly there is a need for an effective threshing and separating arrangement which on the one hand has a good separation capacity and on the other hand is not prone to slugs or roping.

SUMMARY OF THE INVENTION

According to the present invention, there is provided a combine harvester comprising:

a main frame;
a threshing and separating arrangement mounted to said main frame and including:
   a generally cylindrical chamber having a generally longitudinal axis and comprising a separating concave assembly; and
   a rotor assembly mounted for rotation in said chamber and comprising a generally cylindrical rotor body with a separating section associated with said separating concave assembly; and
   said separating section of said rotor assembly comprising a plurality of longitudinal elements having a leading, generally longitudinally arranged crop engaging face;
   characterised in that said separating section further is provided with a plurality of transverse elements having a generally transversely arranged crop engaging edge.

These transverse elements assist in controlling the distribution of straw and other crop material during their passage through the separating section.

The transverse elements may have a leading portion or edge adjacent the rear end of the leading face of one of the longitudinal elements. Their trailing portion may end adjacent a leading face of the next longitudinal element. In this manner the transverse elements bridge the space between the longitudinal elements. The transverse and the longitudinal elements preferably are arranged in an axially staggered pattern.

In order to extend the lifetime of the rotor itself the crop engaging elements may be provided with wear plates which are attached to longitudinal and transverse supports which are affixed to the rotor body.

In order to improve the smoothness of the crop flow, the longitudinal elements may have an outwardly (from the rotor body) and rearwardly (in the direction of the chamber outlet) inclined front edge and/or a leading face which is inclined backwards with respect to the normal rotation of the rotor.

The transverse elements may have a leading edge which is inclined backwards, thereby matching the leading face of the longitudinal elements.

The transverse wear plates may be profiled to present a leading portion extending above its middle portion. The leading portion thereby forms a finger which assists in splitting the crop flow along the concaves.

For enhanced versatility of the separating section, the rotor body may be provided with mounts for generally radially extending thinning rods. In this manner the threshing and separating assembly may be adapted to a wider range of crop and field conditions.

Advantageously the threshing and separating arrangement may comprise a beater assembly arranged behind said concave assembly for receiving threshed and separated crop material therefrom and projecting it rearwardly, said beater assembly comprising a transverse guide means mounted behind said separating concave and below said rotor, and a transverse beater rotor. The threshing chamber may comprise a curved guide plate arranged behind said separating concave and above said guide means for distributing the separated crop material over the full width of said guide means.

DESCRIPTION OF THE FIGURES

A combine harvester in accordance with the present invention will now be described in greater detail, by way of example, with reference to the accompanying drawings, in which:

FIG. 2 is an enlarged side view of one of the rotors of the threshing and separating unit of FIG. 1;

FIG. 3 is cross sectional view of the rotor, taken along line III—III of FIG. 2;

FIG. 4 is a rear view of the threshing and separating unit taken in the direction of arrow IV in FIG. 5;

FIG. 5 is an enlarged side view of the rear section of the threshing and separating unit of FIG. 4, showing a combined guide plate; and FIG. 6 is a perspective view of the guide plate of FIG. 5.

DETAILED DESCRIPTION OF AN EMBODIMENT OF THE INVENTION

Figure 1:
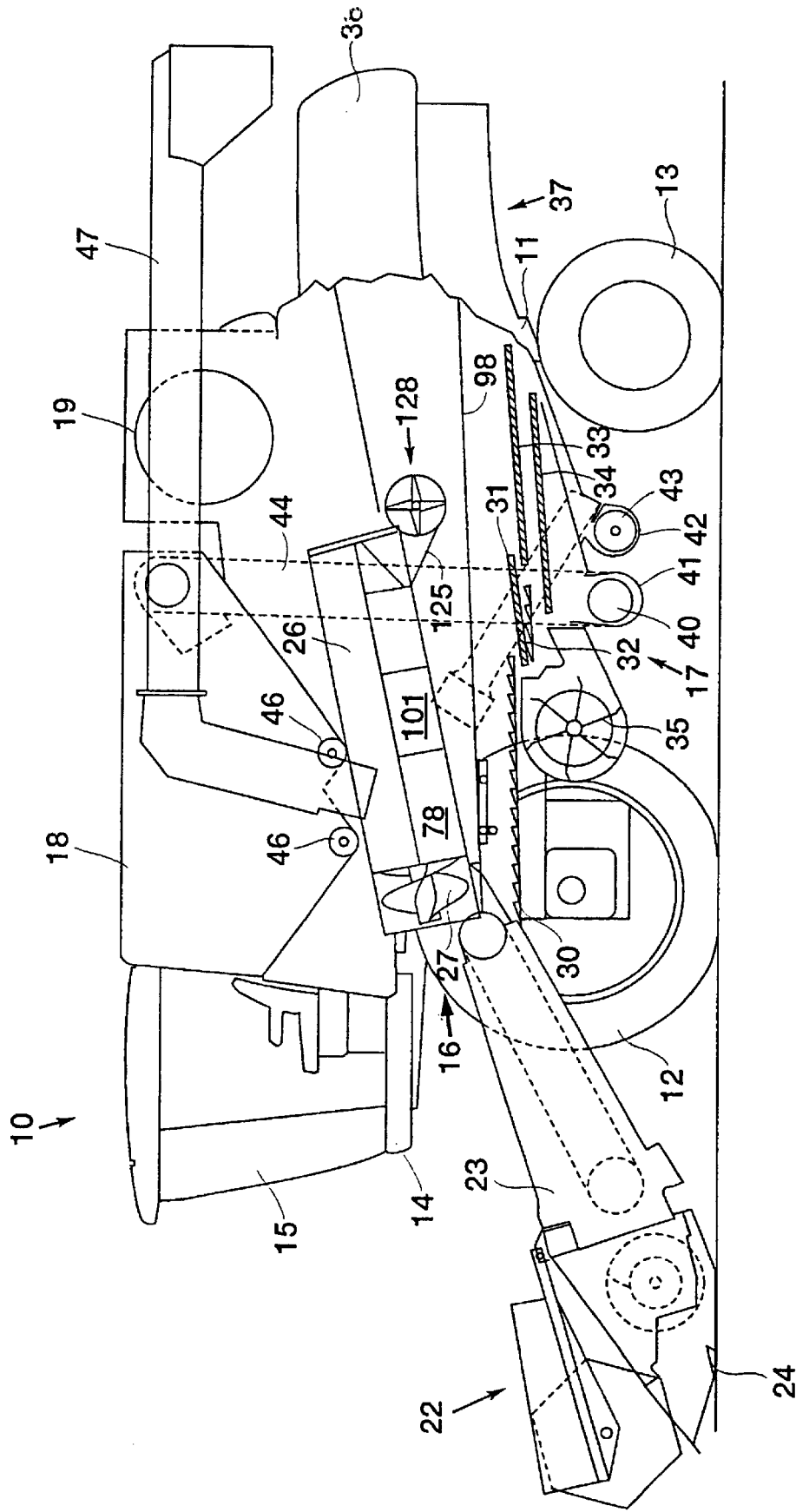
FIG. 1 is a diagrammatic, partly sectional side view of a combine harvester having an axial flow threshing and separating unit.

The terms "grain", "straw" and "tailings" are used principally throughout this specification for convenience at it is to be understood that these terms are not intended to be limiting. Thus "grain" refers to that part of the crop material which is threshed and separated from the discardable part of the crop material which is referred to as "straw". Incompletely threshed crop material is referred to as "tailings". Also the terms "forward", "rearward", "left" and "right", when used in connection with the combine harvester and/or components thereof are determined with reference to the direction of forward operative travel of the combine harvester, but again, they should not be construed as limiting. The terms "longitudinal" and "transverse" are determined with reference to the fore-and-aft direction of the harvester and are equally not to be construed as limiting.

The combine harvester 10 shown in FIG. 1 of the accompanying drawings, is of the axial-flow type, wherein crop material is threshed and separated while it is advanced by and along a longitudinally arranged rotor. The combine harvester comprises a chassis or main frame 11 having a pair of driven, ground-engaging front wheels 12 and a pair of smaller, steerable rear wheels 13. Supported on the main frame 11 are an operator's platform 14 with an operator's cab 15, a threshing and separating assembly 16, a grain cleaning assembly 17, a grain tank 18 and a power plant or engine 19. A conventional header 22 and straw elevator 23 extend forwardly of the main chassis 11 and are pivotally secured thereto for generally vertical movement which is controlled by appropriate actuators, such as hydraulic cylinders (not shown).

As the combine harvester 10 is propelled forwardly over a field with standing crop, the latter is severed from the stubble by a sickle bar 24 at the front of the header 22, whereafter the header and the straw elevator 23 supply the cut crop to the threshing and separating assembly 16.

The threshing and separating assembly 16 comprises a pair of juxtaposed, generally cylindrical chambers 26 in which rotors 27 are rotated to thresh and separate the crop received therein, that is to say, the crop is rubbed and beaten between the rotors 27 and the inner surfaces of the chambers 26, whereby the grain, seed or the like, is loosened and separated from the straw. The chambers and the rotors are described in further detail hereinafter.

Grain which has been separated by the threshing and separating assembly 16 falls onto a first grain pan 30 of the cleaning assembly 17 which further also comprises a pre-cleaning sieve 31, positioned above a second grain pan 32, a pair of sieves 33, 34, disposed the one above the other, and a cleaning fan 35.

The grain pans 30, 32 and the sieves 31, 33, 34 are oscillated generally back-and-forth for transporting threshed and separated grain from the first grain pan 30 to the pre-cleaning sieve 31 and the second grain pan 32 and therefrom to the sieves 33, 34. The same oscillatory movement spreads said grain across said sieves 31, 33, 34, while permitting the passage of cleaned grain by gravity through the apertures of these sieves. The grain on the sieves 31, 33, 34 is subjected to a cleaning action by the fan 35 which provides an air flow through said sieves to remove chaff and other impurities such as dust from the grain by making this material airborne for discharge from the machine through an outlet 37 of the straw hood 38.

Clean grain falls to a clean grain auger 40 in a clean grain auger trough 41 and is subsequently transferred therefrom by a grain elevator 44 to the grain tank 18. Tailings fall to a tailings auger (not shown) in a tailings auger trough 42. The tailings are transported sideways by said tailings auger to a separate rethresher 43 and returned by a tailings conveyor to the cleaning assembly 17 for repeated cleaning action.

A pair of grain tank augers 46 at the bottom of the grain tank 18 is used to urge the clean grain sideways to an unloading tube 47 for discharge from the combine harvester 10.

The rotors 27 of the threshing and separating assembly 16 are mirror images of each other. The left-hand rotor 27, which is shown in FIGS. 2 and 3, is rotated by appropriate means (not shown) in a counter-clockwise direction as seen from the front of the combine harvester 10. The right-hand rotor is rotated in the opposite sense. The main body 50 of each rotor 27 is constituted by a cylindrical tube mounted on discs 51 which are supported on front and rear stub shafts (not shown). The front end of the rotor is provided with an infeed section 52 having a cylindrical tube portion 53 of reduced diameter and a conical tube portion 55 which provides a transition between the portion 53 and the main body 50 of the rotor. A pair of auger flights 54 is welded to the infeed section of each rotor and serves to transfer crop material from the rear end of the straw elevator 23 to the left and right threshing and separating chambers 26.

Each rotor 27 has a threshing section 57, immediately following the infeed section 52, and the threshing section is followed by a separating section 58. The threshing section 57 has a plurality of rasp bars 60, 61 bolted onto rasp bar mounts 62 which are provided at predetermined positions around the periphery of the threshing section 57. The rasp bar mounts are arranged in pairs for fastening a leading rasp bar 60 and a trailing rasp bar 61 to each pair of mounts 62. Also further mounts 63 are provided at predetermined positions both in the threshing section 57 and the separating section 58. These further mounts can be used for mounting thinning rods (not shown) to the rotor 27.

Further details on the configuration of the mounts 62, 63 and the rasp bars 60, 61 can be taken from U.S. Pat. No. 4,889,517, column 3, line 31 to column 7, line 15, incorporated herein by reference.

The separating section 58 of the rotor 27 has several sets of supports 66 for crop engaging elements, which supports are welded at predetermined positions to this separating section 58. Each set comprises three supports 66 which are arranged along helical paths on the rotor body 50. Accordingly the second and third supports 66 are staggered with respect to the first and second support, respectively. The supports 66 are made out of sheet material and generally take the shape of an inverted U with the legs extending rearwardly with respect to the normal crop flow.

The front section 69 of the supports 66 is almost perpendicular to the cylindrical surface of the rotor 27. The surface of this section 69 is inclined slightly rearwardly and its outer edge is sloping inwardly towards the rotor surface.

The middle section 67 of each support 66 is oriented in a generally longitudinal direction. It is positioned at an acute angle (in the range of 12°) to the axis of rotor 27 for better matching the helical flow of the straw and other crop material along the confines of the chamber 26. The surface of the middle section 67 extends from the rotor surface and its leading face is inclined rearwardly with respect to the direction of rotation of the rotor 27. The face may be positioned at an angle of about 75° to the surface of the tube 50. Each middle section 67 has a pair of mounting holes for attaching to its leading face a wear plate 68 of a generally rectangular shape. The wear plates 68 have a front edge which is inclined outwardly and rearwardly to match the plane of the adjacent front section 69 and an outer edge which extends beyond the outer edge of the support 66. Because of their backwards inclined orientation (about 15°), the leading faces of the wear plates 68 tend to force the crop material outwardly against the confines of the cylindrical chamber 26.

The supports 66 further have rear sections 70 which extend from the rear ends of the middle sections 67 in a direction which is generally transverse to the axis of the rotor 27, at an angle of about 87° thereto. In each set of three supports 66, the rear ends of the first and second sections 70 terminate short of the front ends of the middle sections of the second and third support 66, respectively. The plane of the rear sections 70 is generally perpendicular to the surface of tube 50. Each section 70 is provided with a pair of mounting holes for attaching thereto a wear finger plate 71. These plates 71 also have leading edges which are inclined backwards, thereby matching the plane of the longitudinal wear plates 68. At its leading end, each finger plate 71 has a curved protrusion 72 extending beyond the support 66 and constituting the most outward part of the separating section 58 of the rotor 27. The middle portion of the plate 71 is curved inwardly and its trailing portion has a substantially straight edge, parallel to the rotor tube 50 and ending short of the front face of the next, longitudinal wear plate 68. The protrusions 72 engage the crop flow inside the chamber and have a thinning and splitting effect thereupon. Consequently the chances for "roping" of the straw and the consequent blocking of the rotors 27 are reduced substantially by the dedicated outer profile of the wear finger plate 71. This is especially effective under circumstances where the stems of the crop material still contain some humidity.

The thinning effect of the rotor 27 can be enhanced even further by mounting thinning rods (not shown) to the mounts 63 which are distributed between the supports 66. These rods extend perpendicularly from the flat surfaces of mounts 63 which are inclined in two planes so as to impart a trailing angle and a rearward angle for each thinning rod. The trailing angle is defined with respect to the radius of the rotor 27 passing through the bottom end of the rod on the one hand and may be about 30°. The rearward angle is defined as the angle between the rod and the diametral plane of the rotor passing through the same bottom end and may be 32°. The overall orientation of the rods forces the crop material outwardly while their tips smoothen the layer along the inner surface of the chamber 26.

Near their rear ends the rotors 27 are provided with a pair of longitudinally arranged paddles 74. These paddles extend perpendicularly from the rotor tube 50 and assist in discharging the straw from the threshing and separating assembly 16.

The chamber 26 of the threshing and separating assembly 16 has a rear portion including a separating concave assembly 101 disposed adjacent the separating section 58 of the rotor 27. This concave assembly comprises a plurality of interchangeable separating concaves or grates 102, 103. According to one embodiment, as shown in FIGS. 4 and 5, the concave assembly 101 comprises two separating grates 102, each having three transverse curved members 106, one at the front, one in the middle and one at the rear of the grate 102. The curved members are interconnected by a set of spaced, longitudinally arranged slats 107, through which extend a plurality of curved wires 108. The slats 107 are rectangular in cross-section, having their longest side oriented to the axis of the rotor 27. The inward edges are engaged by the crop material for continued threshing action while separating the grain and chaff from the straw.

The inner ends of the curved members 106 have hooks which fit over appropriate mounting means at the centre of the threshing and separating assembly 16. In one embodiment these mounting means may be longitudinal rods 112 mounted through transverse plates 113 of the central framework 111 of the separating assembly. At their outer ends the curved members 106 are welded to a longitudinal flat iron 114 which has apertures for appropriate means such as bolts 116 (FIG. 4) for attaching the outer section of the grate 102 to a profile 115 of the separating assembly. The separating grate 102 can be removed from the harvester 10 after removal of a side panel adjacent the separating concave assembly 101. The bolts 116 are removed such that the outer side of the grate 102 can be lowered, whereafter the hooks 110 can be lifted off the central rod 112.

At the end of the threshing and separating assembly 16, the straw is propelled rearwardly and outwardly by the paddles 74 on the rotors 27. The paddles do not deposit the straw directly onto the ground, but eject it onto a slanting guide plate 125, which is attached to the rear of the separating concave assembly 101, as shown in FIG. 5. The guide plate ends adjacent a transverse beater concave 126 of a beater assembly 128 which is positioned above the chaffer sieve 33. The beater assembly further comprises a transverse beater rotor 127 which is mounted above the concave 126 for engaging the straw which is delivered thereto by the guide plate 125 and for propelling the same through the outlet 37 at the rear of the combine harvester 10.

It is observed that the two counter-rotating rotors 27 tend to deposit most of the straw near the centre of the guide plate 125. For machines operating at high capacities this straw may build up and cause blockages in this portion of the combine harvester 10. Such blockages evolve quickly to the front of the threshing and separating assembly and may cause a complete blockage of the rotors 27. Therefore it is required to make use of the full capacity of the beater assembly 128 and hence to spread out the straw over the full width of the guide plate 125. To this end the rear portion of each rotor chamber 26 is provided with a curved guide plate 130, which generally has the shape of right-angled triangle, with one side which is positioned next to the rear end of the inner chamber walls 122. The outlet edge 131 defining the slanting side of the triangle extends rearwardly and upwardly to the centre line of the rotor 27. As such this outlet edge 131 is generally transverse to the direction of the flow of straw leaving the confines of the chamber 26. The curvature of the guide plate 130 is somewhat larger than the radius of the chamber walls 122. The bases of the triangular plates are welded onto a front support plate 133 which is bolted onto a rear plate 135 of the central framework 111 of the separating assembly. At their rear tips the curved guide plates 130 are joined together at a rear support plate 134, which is bolted onto the rear plate of the threshing and separating assembly 16. The upper edges of the trianglar plates 131 extend generally at the level of the rotor axes, to which they are parallel.

The front section of the guide plate 131 deviates the straw that exits the separating assembly near the end of the grates 102 (or 103 as the case may be) by a larger angle than its rear section, which hardly has any effect on the exit direction of the straw consequently the front portion of the straw flow is directed to the sides of the slanted guide plate 125 while its rear portion is propelled downwardly onto the centre of the guide plate. Accordingly the material is spread evenly before it is engaged by the beater rotor 127. As accumulation in one or other section of the beater assembly 128 is prevented, the chances for blockage of the threshing and separating assembly 16 are reduced.

What is claimed is:

1. A combine harvester comprising:

a main frame;

a threshing and separating arrangement mounted to said main frame and including:

a generally cylindrical chamber having a generally longitudinal axis and comprising a separating concave assembly; and a rotor assembly mounted for rotation in said chamber and comprising a generally cylindrical rotor body with a separating section associated with said separating concave assembly; and said separating section of said rotor assembly comprising a plurality of longitudinal elements having a leading, generally longitudinally arranged crop engaging face said longitudinal elements are arranged in an axially staggered pattern and having longitudinal wear plates which are removably attached to generally longitudinally arranged supports affixed to said rotor body, wherein said longitudinal wear plates and said longitudinal supports have an outwardly and rearwardly inclined front edge and have a leading face which is inclined backwards with respect to the normal rotation of the rotor, wherein said separating section further is provided with a plurality of transverse elements having a generally transversely arranged crop engaging edge said transverse elements are arranged in an axially staggered pattern and have a transverse wear plate which are removably attached to generally transverse supports affixed to said rotor body, wherein said transverse wear plate and said transverse support have a leading edge which is inclined backwards with respect to the normal rotation of the rotor and at least some of said transverse elements have a leading portion adjacent the rear end of a leading face of one of said longitudinal elements and at least some of said transverse elements have a trailing portion ending adjacent a leading face of the longitudinal element, wherein the outer edges of said transverse wear plates are profiled such that their leading portions extend above their middle portions.

2. The combine harvester described in claim 1, wherein said outer, crop engaging edges of said wear plates are profiled such that their trailing portions extend above their middle portions.

3. The combine harvester described in claim 2, wherein said threshing and separating arrangement further comprises:

a beater assembly arranged behind said concave assembly for receiving threshed and separated crop material therefrom and projecting it rearwardly, said beater assembly comprising a transverse guide means mounted behind said separating concave assembly and below said rotor body and a transverse beater rotor; and a curved guide plate arranged behind said separating concave assembly and above said guide means for distributing the separated crop material over the full width of said guide means.

4. The combine harvest described in claim 3, wherein said curved guide plate has an outlet edge which is oriented in a direction which is generally transverse to the direction of the crop flow inside said chamber.

5. The combine harvester described in claim 4, wherein said curved guide plate has a generally triangular shape with its base adjacent said separating concave assembly and its tip adjacent the rear end of said chamber.

6. The combine harvester described in claim 5, wherein said curved guide plate has an upper edge extending at the level of the axis of said cylindrical chamber.

7. The combine harvester described in claim 6, wherein said threshing and separating arrangement further comprises:

a pair of adjacent generally cylindrical chambers each having a rotor assembly mounted therein; a pair of guide plates linked together at their upper edges to form one guide element.

* * * * *